(12) United States Patent
Arai et al.

(10) Patent No.: US 9,193,138 B2
(45) Date of Patent: Nov. 24, 2015

(54) LASER BONDING METHOD

(75) Inventors: Satoshi Arai, Yokohama (JP); Takeshi Hyugano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 13/816,097

(22) PCT Filed: Jun. 29, 2011

(86) PCT No.: PCT/JP2011/003692
§ 371 (c)(1),
(2), (4) Date: Apr. 12, 2013

(87) PCT Pub. No.: WO2012/020531
PCT Pub. Date: Feb. 16, 2012

(65) Prior Publication Data
US 2013/0192751 A1 Aug. 1, 2013

(30) Foreign Application Priority Data

Aug. 11, 2010 (JP) .................................. 2010-179930
May 27, 2011 (JP) .................................. 2011-118636

(51) Int. Cl.
*B32B 37/06* (2006.01)
*B29C 65/44* (2006.01)
(Continued)

(52) U.S. Cl.
CPC ............. *B32B 37/06* (2013.01); *B29C 65/1635* (2013.01); *B29C 65/1654* (2013.01);
(Continued)

(58) Field of Classification Search
CPC .. B29C 65/1654; B29C 65/44; B29C 66/028; B29C 66/1122; B29C 66/21; B29C 66/3032
USPC .......................................... 156/272.2, 272.8
See application file for complete search history.

(56) References Cited

U.S. PATENT DOCUMENTS

| 2005/0208361 | A1* | 9/2005 | Enjoji et al. ................... 429/36 |
| 2008/0286532 | A1* | 11/2008 | Ando ............................ 428/172 |
| 2011/0139353 | A1 | 6/2011 | Sugiyama et al. |

FOREIGN PATENT DOCUMENTS

| JP | 2006-15405 A | 1/2006 |
| JP | 2009-173023 A | 8/2009 |

(Continued)

OTHER PUBLICATIONS

Corresponding International Search Report with English Translation dated Jul. 26, 2011 (five (5) pages).

(Continued)

*Primary Examiner* — Daniel McNally
(74) *Attorney, Agent, or Firm* — Crowell & Moring LLP

(57) ABSTRACT

Provided is a laser bonding method which is a highly reliable laser bonding method for a thermoplastic resin and a metal, wherein the adhesiveness at an interface between a thermoplastic resin and a metal is improved to prevent peeling due to heat stress at the time of bonding. Accordingly, the method includes a step of forming an oxide layer having a higher oxygen functional group content than a bulk thermoplastic resin by subjecting at least a thermoplastic resin on the side of a bonding interface to a surface modification treatment prior to bonding, and the thermoplastic resin and a metal are bonded to each other by applying pressure and irradiating a laser in a state where the surface energy of the metal on the bonding surface side is increased to be larger than that of the thermoplastic resin having the oxide layer formed thereon.

15 Claims, 10 Drawing Sheets

(51) Int. Cl.
*B29C 65/00* (2006.01)
*B29C 65/16* (2006.01)
*B29C 65/82* (2006.01)

(52) U.S. Cl.
CPC ............... *B29C65/44* (2013.01); *B29C 66/028* (2013.01); *B29C 66/1122* (2013.01); *B29C 66/21* (2013.01); *B29C 66/3032* (2013.01); *B29C 66/30321* (2013.01); *B29C 66/30325* (2013.01); *B29C 66/41* (2013.01); *B29C 66/7392* (2013.01); *B29C 66/73162* (2013.01); *B29C 66/742* (2013.01); *B29C 66/8122* (2013.01); *B29C 66/81267* (2013.01); *B29C 65/1616* (2013.01); *B29C 65/8207* (2013.01); *B29C 66/0016* (2013.01); *B29C 66/8322* (2013.01); *B29K 2995/0072* (2013.01)

(56) References Cited

FOREIGN PATENT DOCUMENTS

| JP | 2010-46831 A | | 3/2010 |
| JP | 2010046831 A | * | 3/2010 |
| JP | 2010-76437 A | | 4/2010 |
| JP | 2010076437 A | * | 4/2010 |

OTHER PUBLICATIONS

Seiji Katayama et al., "Laser-Assisted Metal and Plastic (LAMP) Joining", Proceedings of the 4th International Congress on Laser Advanced Materials Processing, 2006, pp. 1-5.

Takashi Nishino, "Functionalization of Polymer by Surface Modification", Science & Industry, vol. 80, No. 11, 2006, pp. 512-518.

* cited by examiner

LASER BONDING METHOD

TECHNICAL FIELD

The present invention relates to a laser bonding method, in which a thermoplastic resin and a metal are bonded to each other by laser irradiation.

BACKGROUND ART

Thermoplastic resins have excellent processability and a high degree of freedom in shape, and therefore are widely used in automobiles, electrical devices, medical and biological devices, and other general industrial applications, and are commonly used to such an extent that there is no field in which thermoplastic resins are not used and have become familiar materials. At the beginning, thermoplastic resins are used as substitutes for natural materials such as wood materials and paper, however, today, a number of specialized products which can be produced only with a plastic material have been developed. Due to this, if an optimal material or an optimal processing method can be provided for the purpose of design development, there is a possibility to produce unprecedented novel products.

In addition, due to the recent trend toward limits on carbon dioxide emissions and reduction in costs, the functions of thermoplastic resins are enhanced, and also thermoplastic resins are gradually substituted for metals. However, thermoplastic resins generally have many inferior properties to metals, for example, thermoplastic resins have a low heat-resistant temperature, a low mechanical strength, and a high thermal expansion, are easily deformed or decomposed, easily dissolve in an organic solvent, and are easily swollen by water, etc., and therefore, it is impossible to completely substitute thermoplastic resins for metals.

In particular, since the structures of recent products become complicated, designing is made by utilizing the respective advantages of thermoplastic resins and metals, and therefore, a secondary processing technique therefor becomes important. Among these, studies of methods using a laser have been increasing recently.

In PTL 1, it is described that by irradiating an acrylic resin and tin with an irregular surface which has been roughened with sandpaper with a laser in a state where the both members are in close contact with each other, the acrylic resin gets into the surface irregularities to form strong bonding.

In PTL 2, it is shown that by irradiating a molded body composed of a thermoplastic resin and a metal with a laser from the metal side in a state where both members are overlapped with each other, the molded body can be strongly bonded to the metal even if the laser light does not transmit through the molded body. It is also described that a surface treatment of the surface of the metal on the bonding surface side is effective in the improvement of the bonding strength.

In NPL 1, it is shown that by irradiating a plastic and a metal with a high-power laser in a state where both members are overlapped with each other, minute air bubbles are generated in the vicinity of the interface of the plastic, and by the effect of the pressure at the time of generating the air bubbles, the plastic and the metal can be strongly bonded to each other.

CITATION LIST

Patent Literature

PTL 1: JP-A-2006-15405
PTL 2: JP-A-2010-76437

Non-Patent Literature

NPL 1: S. Katayama, Y. Kawahito, A. Tange and S. Kubota, "Laser-Assisted Metal and Plastic (LAMP) joining", Online Proc. of LAMP 2006, JLPS, #06-7 (2006)

NPL 2: Takashi Nishino, "Hyomen Kaishitsu ni yoru Kobunshi no Kinouka (Functionalization of Polymer by Surface Modification)", Science & industry, 80, (11), 512-518 (2006)

SUMMARY OF INVENTION

Technical Problem

The technique disclosed in PTL 1 is effective in the case of a thermoplastic resin having an oxygen functional group such as an acrylic resin, however, it was found that in the case of a thermoplastic resin without having an oxygen functional group, strong bonding through an oxide film of a metal surface and an oxygen functional group is not formed, and therefore, the bonding strength is low. Further, even if the thermoplastic resin has an oxygen functional group such as an acrylic resin, because the total amount of the oxygen functional group is small, the adhesiveness at the interface is low, and therefore, a sufficient margin cannot be ensured in terms of strength in many cases.

It is shown that in the technique disclosed in PTL 2, by subjecting the bonding surface on the metal side to a surface treatment, the strength is improved, however, in the same manner as in the above-described PTL 1, the adhesiveness at the interface is low, and therefore, a sufficient margin cannot be ensured in terms of strength in many cases. Further, in the above-described PTLs 1 and 2, an anchor effect is the main effect, and therefore, although the strength in a shearing direction is high, there was a problem that the strength in a tensile direction and a peeling direction is low. Moreover, since the interfacial strength is low, peeling is caused at the interface during cooling at the time of laser bonding or in a reliability test, and as a result, stress is concentrated at a site where bonding is partially achieved, and therefore, a disadvantage that the reliability is low was found.

In the technique disclosed in NPL 1, by irradiating a high-power laser and employing generated minute air bubbles of a plastic, the strength is exhibited, however, the thermoplastic resin is limited, and it has been confirmed that in the case of particularly a thermoplastic resin without having an oxygen functional group, bonding cannot be achieved.

As described above, the techniques in which a resin and a metal are bonded to each other by using laser light as a heating source have a large problem that the resin which can be bonded is limited.

Means for Solving the Problems

Therefore, in order to solve the above problem, the present inventors found that an oxide layer having a higher oxygen functional group content than a bulk material is formed on a thermoplastic resin on the bonding surface side using a dry surface modification treatment prior to laser irradiation, pressure is applied in a state where the surface energy of a metal on the bonding surface side is increased to be larger than that of the thermoplastic resin having the oxide layer formed thereon, and a laser is irradiated from the side of the thermoplastic resin or the metal, whereby stronger bonding can be obtained. In general, it is known that a surface modification treatment of a thermoplastic resin is effective in the case of adhesion or the like. According to NPL 2, it has been confirmed that when polyethylene terephthalate (PET) is subjected to a corona treatment and thereafter left at 150° C. for 3 minutes, PET does not adhere at all. The reason is considered to be that the thermal motion of PET molecular chain is induced by a high temperature, and the introduced oxygen functional group disappears from the surface. Therefore, it is generally considered that also in the case of laser bonding, an effect disappears in the same manner as the case of adhesion. However, the present inventors newly found that in the case of laser bonding, bonding can be achieved before the effect of surface modification disappears because materials are instantaneously heated and brought into close contact with each other. Further, in the invention, the adhesiveness at the interface is improved, and therefore, it has a characteristic that the tensile strength and the peeling strength are also high.

That is, the invention is characterized in that laser bonding includes a step of subjecting an interface of a thermoplastic resin to a surface modification treatment for producing or increasing an oxygen functional group, and a step of bonding the interface of the thermoplastic resin subjected to the surface modification treatment to a metal by heating through laser irradiation.

Advantage Effects

According to the invention, in laser bonding or welding of a thermoplastic resin and a metal, by improving the adhesiveness at the interface of the bonding portions, peeling due to heat stress at the time of bonding is suppressed, and highly reliable bonding can be achieved. Further, even in the case of a combination in which bonding cannot be achieved by a conventional method, favorable bonding can be achieved.

DESCRIPTION OF EMBODIMENTS

Hereinafter, embodiments of the invention will be described. The thermoplastic resin to be used in the invention is composed of an amorphous or crystalline resin. Examples of the amorphous resin include polystyrene (PS), acrylonitrile styrene (AS), an acrylonitrile butadiene-styrene copolymer (ABS), polyether imide (PEI), polycarbonate (PC), polyarylate (PAR), polymethyl methyl methacrylate (PMMA), a cyclo olefin polymer (COP), a cyclo olefin copolymer (COC), polysulfone (PSF), polyethersulfone (PES), polyvinyl chloride (PVC), and polyvinylidene chloride (PVDC). Examples of the crystalline resin include polyethylene (PE), polypropylene (PP), polyoxymethylene (POM), polyethylene terephthalate (PET), polytrimethylene terephthalate (PTT), polybutylene terephthalate (PBT), polyethylene naphthalate (PEN), polyphenylene sulfide (PPS), nylon 6 (PA6), nylon 66 (PA66), nylon 6T (PA6T), polyether ether ketone (PEEK), a liquid crystal polymer (LCP), and polytetrafluoroethylene (PTFE). Further, an alloy material of such a thermoplastic resin and a thermoplastic resin containing a filler is also used. In general, the amorphous resin has excellent moldability and transparency, and the crystalline resin has excellent heat resistance and chemical resistance.

Examples of the metal include iron, aluminum, copper, nickel, gold, titanium, alloys (such as stainless steel, brass, aluminum alloys, and phosphor bronze), and die castings. Further, in the invention, a metal film (such as a metal plating film or a metal deposited film) is also used.

As for the conditions for laser bonding or welding, a laser spot size, power, an irradiation time, and a pressure to be applied are determined in consideration of the transmittance and absorptivity of the material at a wavelength of the laser irradiation and the thermal conductivity thereof. As a light source to be used in the laser bonding, an infrared range laser including a semiconductor laser, a YAG laser, and a fiber laser is preferable. The intensity distribution of the laser light source can vary variously depending on an attached lens such as a Gaussian type, a top-hat type, or a ring type. However, from the viewpoint of ease of obtaining a uniform welding state, it is desirable to use a light source with an intensity distribution of a top-hat type or a ring type in which the median intensity is 50% or more of the maximum.

Embodiment 1

Figure 1:
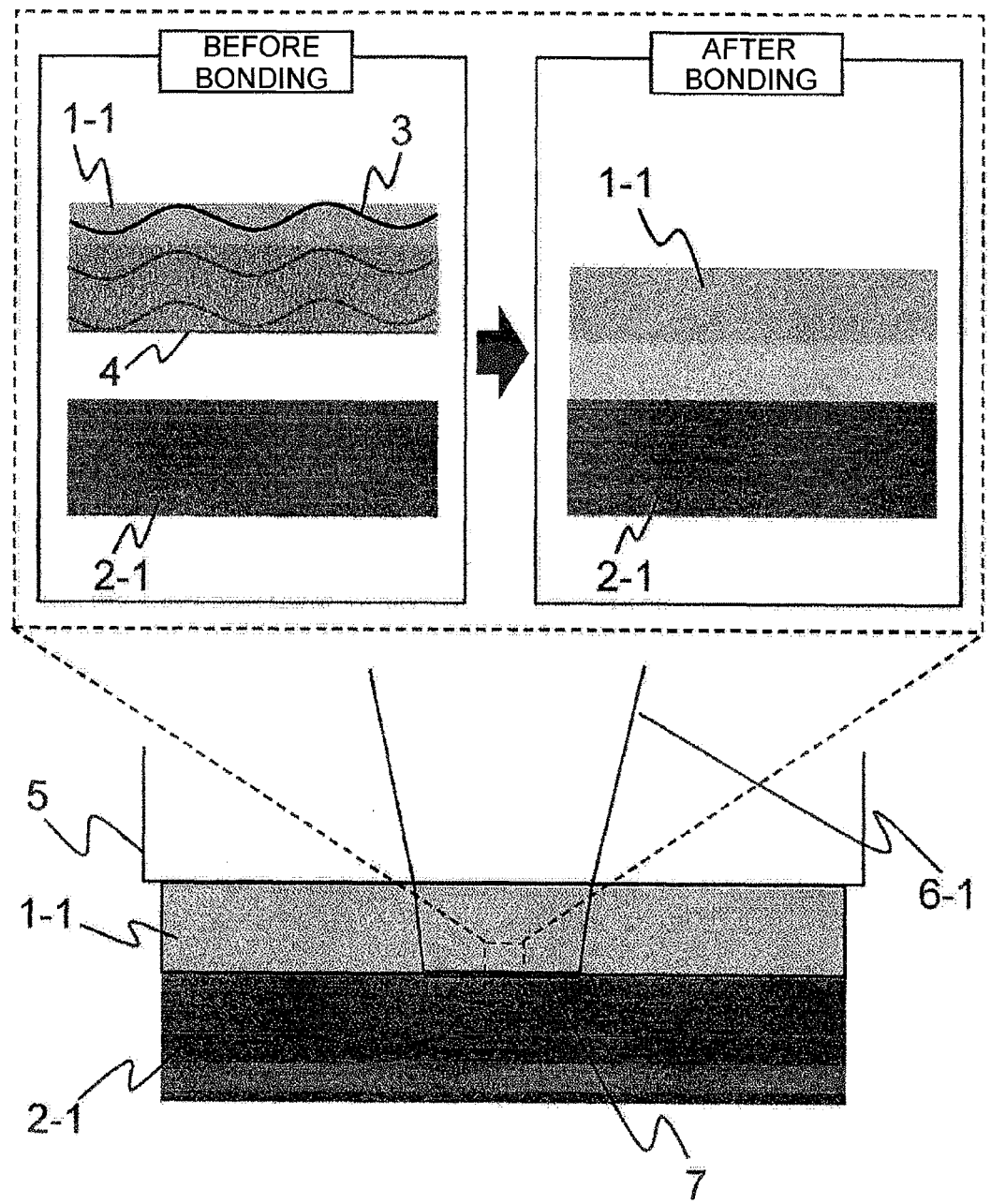
FIG. 1 is a view showing one embodiment of a laser bonding method for a thermoplastic resin and a metal of the invention.

FIG. 1 is a plan view showing an embodiment of the laser bonding method for a resin and a metal of the invention. This embodiment is characterized in that laser bonding is performed by irradiating laser light 6-1 from the side of a thermoplastic resin 1-1 in a state where an oxide layer 4 is formed on an interface of a bulk thermoplastic resin 1-1 by subjecting the thermoplastic resin 1-1 on the side of a bonding interface to a surface modification treatment before the thermoplastic resin 1-1 and a metal 2-1 are laser-bonded so that in the case where the thermoplastic resin 1-1 does not contain an oxygen functional group, an oxygen functional group is formed, and in the case where the thermoplastic resin 1-1 contains an oxygen functional group, the oxygen functional group is increased. As the surface modification treatment, it is preferable to use a dry treatment selected from a UV ozone treatment, a plasma treatment, a corona treatment, and a short-pulse (the pulse width is picoseconds or less) laser treatment in consideration of an effect on the environment and other components. By performing such a treatment, a C—C bond or a C—H bond in a main chain 3 or a side chain of the thermoplastic resin 1-1 is cleaved to form or increase an oxygen functional group such as CO, COO, or C=O, whereby the surface energy is increased.

Further, in the case where PPS is used as the thermoplastic resin 1-1, also $SO_3H$ and a polar group with high polarity are newly formed. The metal 2-1 usually has an oxide film formed on its surface, and therefore is generally in such a state that the surface energy is very high. Therefore, by performing the surface modification treatment on the side of the thermoplastic resin 1-1, the surface energies of both members come close to each other, and thus, it becomes possible to form strong bonding to the metal oxide film.

Incidentally, in the case where the surface energy on the side of the thermoplastic resin 1-1 is larger than that of the metal, it is difficult to wet the thermoplastic resin 1-1, and therefore, the adhesiveness at the interface tends to be deteriorated. Due to this, it is important to at least increase the surface energy of the metal 2-1 to be larger than that of the thermoplastic resin 1-1 before irradiating the laser light 6-1. Further, by performing laser bonding in such a state, not only can the interfacial strength be improved by wetting, but also a hydrogen bond which is stronger than van der Waals force can be formed.

Accordingly, in addition to the improvement of wetting, by the formation of a hydrogen bond, the interfacial strength is improved.

In the case where a foreign matter or the like is attached to the surface of the metal 2-1, it is desirable to perform degreasing with an alcohol or the like. Further, it is also effective to perform a surface modification treatment on the side of the metal 2-1. However, in the case where a foreign matter is rigidly attached thereto or the attached matter is an inorganic substance, a plasma treatment or a laser treatment is the most suitable method. As a plasma discharge treatment, mainly an oxygen plasma treatment or a nitrogen plasma treatment is effective in consideration that it is most important to introduce an oxygen functional group. The oxide film 4 containing oxygen of the thermoplastic resin 1-1 desirably has a thickness of at least about 5 nm.

Such a surface modification treatment is a method commonly used in adhesion and the like. It is generally known that a surface modification treatment of a thermoplastic resin is effective in adhesion and the like. However, it is also known that if the thermoplastic resin is left at a high temperature, the oxygen functional group formed at the interface penetrates into the inside due to thermal motion and the effect of the modification disappears. The result thereof is shown in NPL 2, and it has been confirmed that when polyethylene terephthalate (PET) is subjected to a corona treatment and thereafter left at 150° C. for 3 minutes, PET does not adhere at all.

In the laser bonding, the heat of the metal 2-1 is conducted to the thermoplastic resin 1-1, and the thermoplastic resin 1-1 is melted or softened to cause wetting, whereby the thermoplastic resin 1-1 and the metal come into close contact with each other. However, from the viewpoint of the case of adhesion, since the temperature at the time of bonding reaches several hundred degrees centigrade or higher, there is a concern that the effect of the modification disappears. However, the present inventors have found that since the laser irradiation time is instantaneous and the scanning time is about several seconds, which is very short, and therefore, the surface modification treatment is effective in the laser bonding of the thermoplastic resin 1-1 and the metal 2-1.

In the laser bonding of the thermoplastic resin 1-1 and the metal, in particular, it is necessary to further increase the temperature of the thermoplastic resin 1-1 as compared with the case where the thermoplastic resins 1-1 are laser-welded, and therefore, heat of the thermoplastic resin 1-1 is liable to be confined in a central region of the laser irradiation to detach the thermoplastic resin, and therefore there is a problem that adhesiveness cannot be ensured. Due to this, it is important to sufficiently apply pressure to the upper part of the bonding portion. As a pressing material 5 to be used for applying pressure, it is preferable to use a transparent material, and a desirable embodiment is to use glass which has a particularly high thermal conductivity and is transparent. Further, it is desirable that a closely contacting portion on the side of the thermoplastic resin 1-1 is mirror-finished.

In the case where the laser light 6-1 is incident from the side of the thermoplastic resin 1-1, the transmittance of the thermoplastic resin 1-1 may sometimes become a problem. In this configuration, it is preferable to use a thermoplastic resin 1-1 whose color is transparent or natural, and it is desirable to use a thermoplastic resin 1-1 having a transmittance of at least 50% or more.

It is also effective that on the surface of the metal, a black film such as carbon is deposited. As another method, it is also effective that the absorptivity of the laser light 6-1 is increased by applying a ceramic coat, a black resin, or the like thereto by electrodeposition.

Here, the results of evaluating a bonding strength when a transparent resin COP was used as the thermoplastic resin 1-1 and stainless steel (SUS304) was used as the metal 2-1 are shown in Table 1. As the surface modification treatment, a UV ozone treatment was used for the thermoplastic resin 1-1, and an oxygen plasma treatment was used for the metal 2-1. Incidentally, Table 1 shows the results of evaluating a strength when bonding was performed by irradiating the laser light 6-1 after one day from the completion of the treatment. The size of a test piece of each of the COP resin and the stainless steel used was 70 mm×20 mm, and the thicknesses of the COP resin and the stainless steel were 2 mm and 1 mm, respectively. Further, the surface of the COP resin was mirror-finished, and therefore, the Rz thereof was 1.0 µm or less. The surface of the stainless steel was polished to an Rz of about 1.5 µm, and the evaluation was performed. As the laser light 6-1, a line laser with a size of 10 mm×1 mm with a mixture of wavelengths of 940 nm and 808 nm was used, and an area of 10 mm×20 mm was irradiated with the laser light with a length of 20 mm at a rate of 5 mm/s. The width of a region where bonding is achieved or the resin is melted by the laser light 6-1 is increased depending on the laser power, however, as for the results of this embodiment, the results when the bonding width became about 10 mm are shown. A bonded sample was pulled in a shearing direction at a rate of 1.0 mm/min, and a breaking strength of the sample was measured. Further, a bonding strength per unit area was calculated from the area after bonding and the breaking strength.

As a result, it was revealed that in the case of COP which does not have a polar group in the thermoplastic resin 1-1, by at least performing the surface modification treatment on the side of COP as a pretreatment, a strength to such an extent that the COP resin is broken at the time of the shearing test is exhibited. As for the results of this embodiment, the results only when the laser power was 300 W are shown, however, it has been confirmed that in the case where the treatment is not performed on the side of COP, bonding is not achieved even when the laser power is from 325 to 425 W.

Embodiment 3

Figure 3:
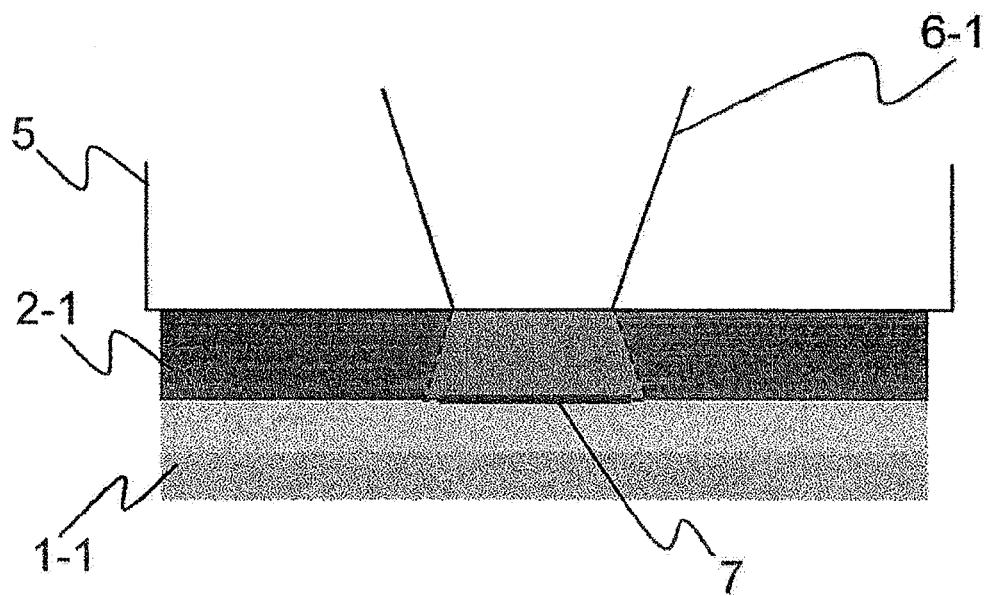
FIG. 3 is a view showing another embodiment of a laser bonding method for a thermoplastic resin and a metal of the invention.

FIG. 3 is a plan view showing another embodiment of the laser bonding method for a thermoplastic resin 1-1 and a metal 2-1 of the invention. A point in which laser light 6-1 is irradiated from the side of the metal 2-1 without passing through the thermoplastic resin 1-1 is different from Embodiment 1 and the other points are the same.

In the laser bonding of a thermoplastic resin 1-1 and a metal 2-1, if the transmittance of the thermoplastic resin 1-1 is low, when laser light 6-1 is irradiated from the side of the thermoplastic resin 1-1, energy may be concentrated on a surface portion of the thermoplastic resin 1-1 where the laser is incident to cause carbonization in some cases. In view of this, if

TABLE 1

| Resin | Surface treatment method | Treatment time (s) | Metal | Surface treatment | Treatment time (s) | Laser power (W) | Bonding strength (MPa) |
|---|---|---|---|---|---|---|---|
| COP | — | — | Stainless steel | — | — | 300 | 0.0 |
|  | — | — |  | $O_2$ plasma | 300 |  | 0.0 |
|  | UV ozone | 150 |  | — | — |  | 7.9* |
|  | UV ozone | 150 |  | $O_2$ plasma | 300 |  | 8.5* |

*Material failure

Embodiment 2

Figure 2:
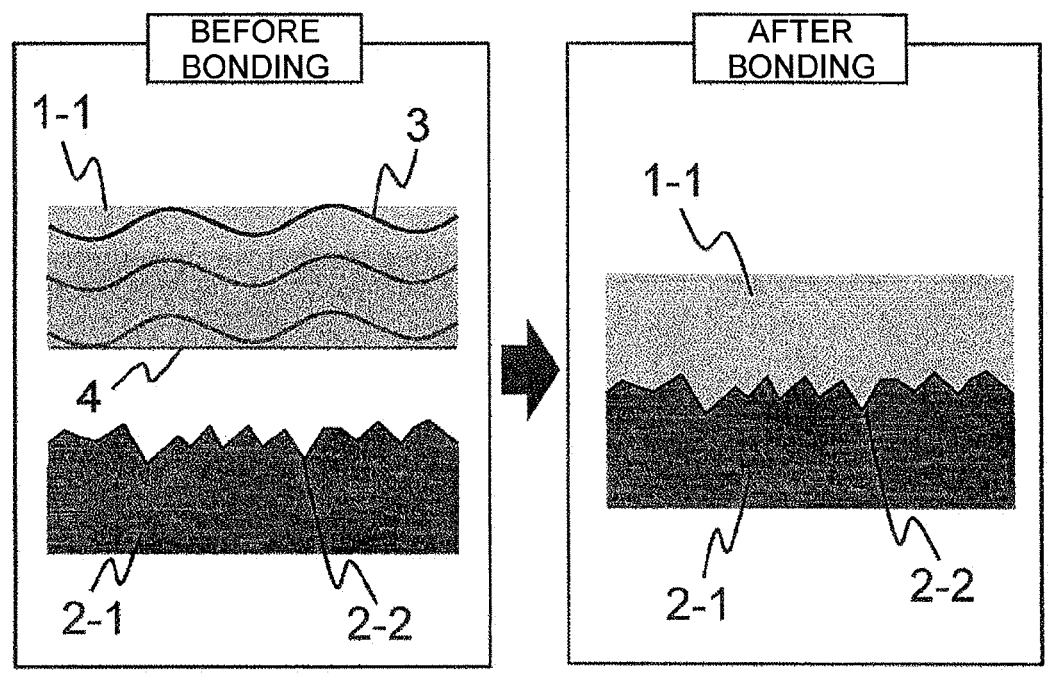
FIG. 2 is a view showing another embodiment of a laser bonding method for a thermoplastic resin and a metal of the invention.

FIG. 2 is a schematic view showing another embodiment of the laser bonding method for a thermoplastic resin 1-1 and a metal 2-1 of the invention. A point in which fine irregularities 2-2 are formed on a bonding interface of the metal 2-1 is different from Embodiment 1 and the other points are the same.

In a state where fine irregularities 2-2 are formed on a bonding interface of a metal 2-1, a thermoplastic resin 1-1 subjected to the above-described surface modification treatment and the metal 2-1 having the fine irregularities 2-2 formed thereon are laser-bonded to each other. It is more preferable that the fine irregularities 2-2 are subjected to a sandblasting treatment, a laser treatment, or the like. Further, in the case where a metal material is aluminum, other than the sandblasting treatment, an anodization treatment or an electrolytic treatment for forming nanoporous pores may be performed. In this manner, by forming the fine irregularities 2-2 on the interface of the metal 2-1, an actual surface area is increased, and therefore, a wetting effect on the surface to be wet is more enhanced. Also at this time, it is important to at least increase the surface energy of the metal 2-1 to be larger than that of the thermoplastic resin 1-1 before irradiating the laser light 6-1 in the same manner as Embodiment 1. Incidentally, in the case where the surface energy on the side of the thermoplastic resin 1-1 is larger than that of the metal 2-1, it becomes more difficult to cause wetting, and therefore, caution is required. Further, not only is the interfacial strength improved by the enhancement of wetting, but also the bonding strength is further improved because an anchor effect is also exhibited. In view of this, by combining the improvement of the adhesion interface and the strength with the anchor effect, the bonding strength in all directions is improved, and therefore, this is a desirable configuration.

the transmittance of the thermoplastic resin 1-1 is low, it is preferable to irradiate the laser light 6-1 from the side of the metal 2-1. According to this configuration, the thermoplastic resin 1-1 and the metal 2-1 can be laser-bonded to each other without being affected by the coloration or transparency of the thermoplastic resin 1-1. However, in the case of this configuration, according to the thickness or thermal conductivity of the metal 2-1, the metal 2-1 may be melted in some cases. Therefore, if design permits, it is more preferable to perform the bonding in a state where the thickness of the metal 2-1 is as small as 1.0 mm which does not cause the melting of the metal 2-1. Further, if the surface of the metal 2-1 to be irradiated with the laser light 6-1 is roughened by blasting or the like in advance, a necessary laser power can be reduced by the laser scattering effect, and therefore, this is an effective method.

Further, it is also desirable to subject the surface of the metal 2-1 to be irradiated with the laser light 6-1 to a blackening treatment in advance.

In Table 2, the results of evaluating a bonding strength when non-transparent PPS, PA6T, or PBT was used as the thermoplastic resin 1-1 and SUS304 or A5052 was used as the metal are shown. Since the thermoplastic resin 1-1 was not transparent, the laser light 6-1 was irradiated from the side of the metal 2-1. Further, the surface modification treatment of the thermoplastic resin 1-1 was changed depending on the combination, and a UV ozone treatment or a plasma treatment was performed. Incidentally, as the thermoplastic resin 1-1, one having a thickness of 3 mm was used. The other conditions were the same as those shown in Table 1.

From the results, it was revealed that the surface treatment of the thermoplastic resin 1-1 was effective in all combinations.

TABLE 2

| Resin | Surface treatment method | Treatment time (s) | Metal | Surface treatment | Treatment time (s) | Laser power (W) | Bonding strength (MPa) |
|---|---|---|---|---|---|---|---|
| PPS | — | — | Stainless steel | — | — | 350 | 2.4 |
| | O₂ plasma | 120 | | O₂ plasma | 300 | | 10.8 |
| | — | — | A5052 | — | — | 750 | 0.0 |
| | UV ozone | 300 | | O₂ plasma | 300 | | 8.2 |
| PA6T | — | — | Stainless steel | — | — | 300 | 6.2 |
| | O₂ plasma | 120 | | O₂ plasma | 300 | | 9.3 |
| | — | — | A5052 | — | — | 700 | 3.2 |
| | O₂ plasma | 120 | | O₂ plasma | 300 | | 6.6 |
| PBT | — | — | Stainless steel | — | — | 275 | 4.2 |
| | UV ozone | 300 | | O₂ plasma | 300 | | 8.5* |
| | — | — | A5052 | — | — | 550 | 0.0 |
| | UV ozone | 300 | | O₂ plasma | 300 | | 7.3 |

*Material failure

Although the temperature of the bonding surface of the metal 2-1 at the time of irradiation with the laser light 6-1 was several hundred degrees centigrade or higher, from Tables 1 and 2, it was revealed that the oxide layer 4 on the outermost surface produced by surface modification has a large effect even in such a high-temperature condition.

It is desirable that the metal 2-1 has a small thickness, however, for example, in the case where a line-shaped laser is used, since the width of the laser is large, even if the metal 2-1 has a large thickness, the melting thereof is not caused in some cases.

Figure 8:
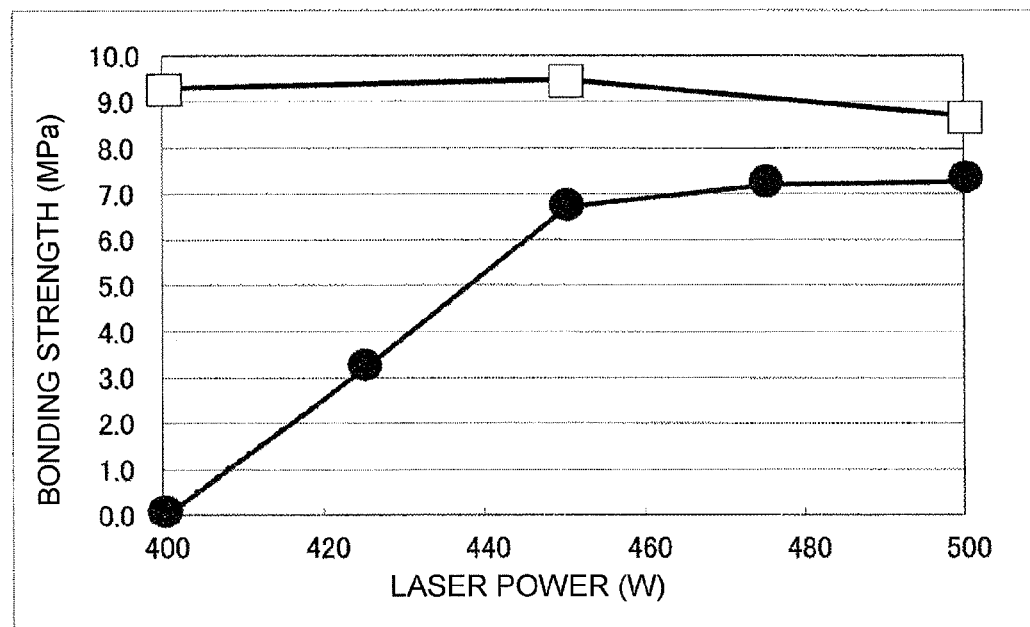
FIG. 8 is one example of experimental results showing a relationship between a laser power and a bonding strength in a combination of PA6T with stainless steel in the presence or absence of a surface modification treatment.

FIG. 8 shows the results of laser power dependence when PA6T having a thickness of 3 mm was used as the thermoplastic resin 1-1 and stainless steel having a thickness of 2 mm was used as the metal 2-1. As for the surface modification treatment of PA6T as the thermoplastic resin 1-1, an oxygen plasma treatment was performed for 120 seconds in the same manner as in Table 2. As a result, it was revealed that as the laser power is decreased, the effect of the surface modification treatment is increased. In particular, when a comparison was made at the time of setting the laser power to 400 W, in the case where the surface modification treatment was not performed, the strength was not exhibited, however, in the case where the surface modification treatment was performed, the strength was as high as 9.3 MPa. In view of this, even in the case of a combination of the thermoplastic resin 1-1, which is relatively easily bondable, with the metal 2-1, if the surface modification treatment is performed, bonding can be achieved with a low power. Therefore, even in the case where the metal has a large thickness, the bonding can be achieved as long as the melting of the metal 2-1 is suppressed. Further, the surface modification treatment largely contributes to the reduction in cost of the device or the prolongation of the life of the laser light source.

Figure 9:
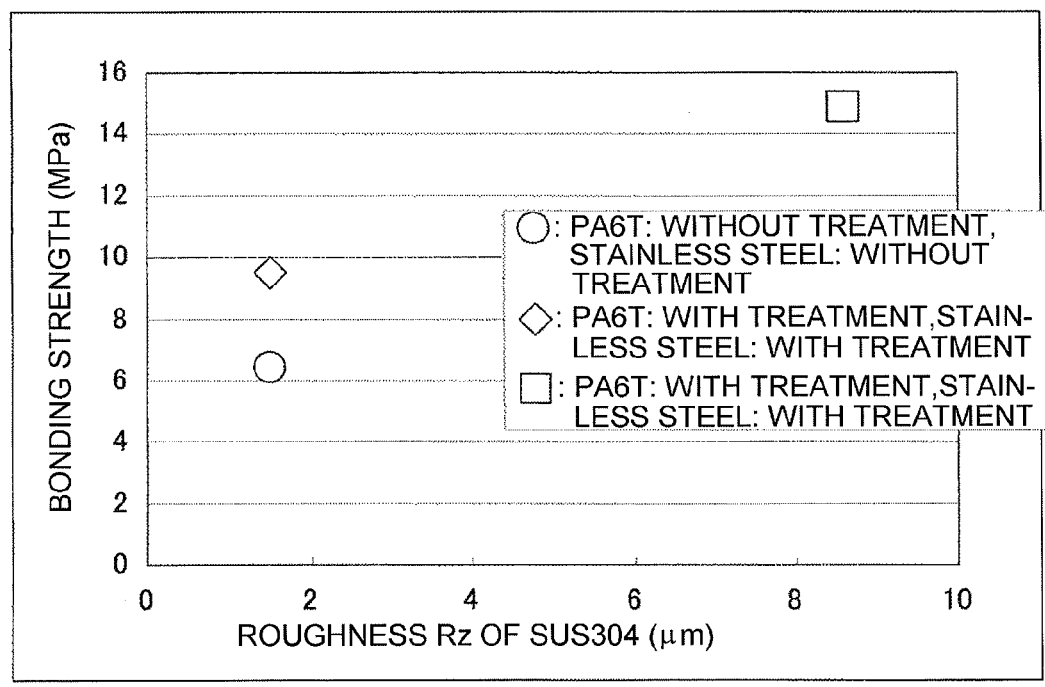
FIG. 9 is one example of experimental results showing an effect of increasing the roughness of stainless steel in a combination of PA6T with stainless steel.

FIG. 9 shows the results when PA6T and stainless steel shown in Table 2 were used in combination, and the bonding surface of stainless steel was subjected to sandblasting with sand #240 and roughened to a roughness Rz of 8.6 μm. Incidentally, as PA6T, one having a roughness Rz of 1.4 μm was used. The other conditions were the same as those in the case shown in Table 2. As a result, it was revealed that by combining the effect of the surface treatment of PA6T with the effect of the fine roughness of SUS304, the bonding strength is increased to 2.5 times at most. Accordingly, it can be said that it is effective in the improvement of the strength to perform the surface modification treatment of the thermoplastic resin 1-1 and increase the roughness of the metal 2-1 to be higher than that of the thermoplastic resin 1-1.

Embodiment 4

Figure 4:
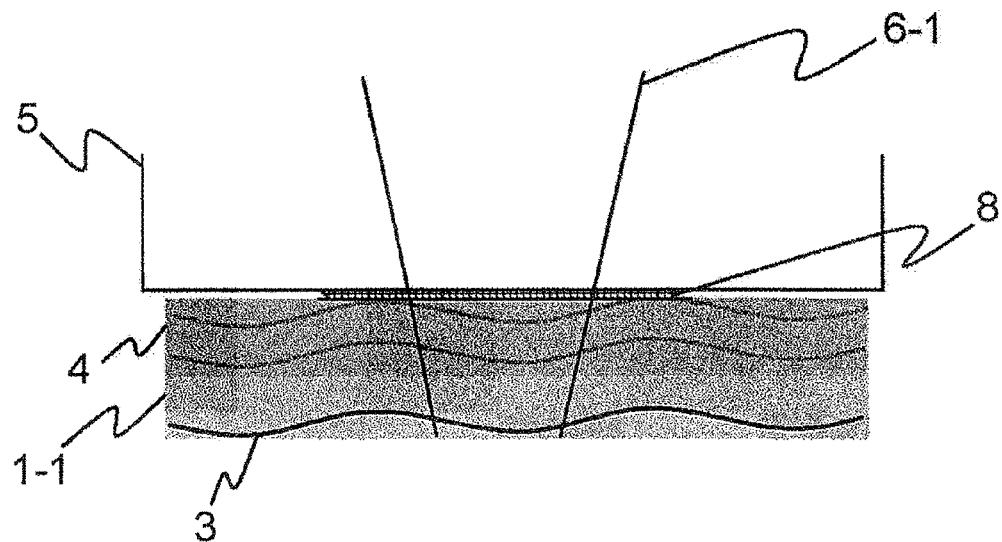
FIG. 4 is a view showing another embodiment of a laser bonding method for a thermoplastic resin and a metal of the invention.

FIG. 4 is a plan view showing another embodiment of the laser bonding method for a thermoplastic resin 1-1 and a metal 2-1 of the invention. A point in which an oxide layer 4 is formed also on the surface of the thermoplastic resin 1-1 on the opposite side to the bonding surface thereof, and a point in which an intermediate material 8 is interposed between the thermoplastic resin 1-1 and a pressing material 5 are different from Embodiment 1. Although not shown in the drawing, on the lower side of FIG. 4, an oxide layer 4 on the side of the bonding surface and a metal 2-1 are present in the same manner as in FIG. 1, and laser light 6-1 is irradiated onto the bonding surface.

In the case where the laser light 6-1 is irradiated from the side of the thermoplastic resin 1-1, the outermost surface of the thermoplastic resin 1-1 may be carbonized to cause a problem in some cases. In particular, even in the case where pressure is applied by glass serving as the pressing material 5 having a high thermal conductivity, it is impossible to bring the glass into complete contact with the surface of the thermoplastic resin 1-1. Therefore, it is effective to perform bonding after the surface of the thermoplastic resin 1-1 on the side to be irradiated with a laser is also subjected to a surface modification treatment so as to incorporate water serving as the intermediate material 8 between the thermoplastic resin 1-1 and the glass serving as the pressing material 5 and bring the surface into a wet state. By doing this, the reflection from the interface between the thermoplastic resin 1-1 and water serving as the intermediate material 8 is reduced and heat radiation to glass is improved, whereby it becomes possible to suppress the carbonization of the thermoplastic resin 1-1. It is difficult to use this method in the case where bonding is performed in a state where an electronic device is disposed in the vicinity thereof, however, this method is a more preferable method in the case where a medical or biological component is bonded or the like.

Embodiment 5

Figure 5:
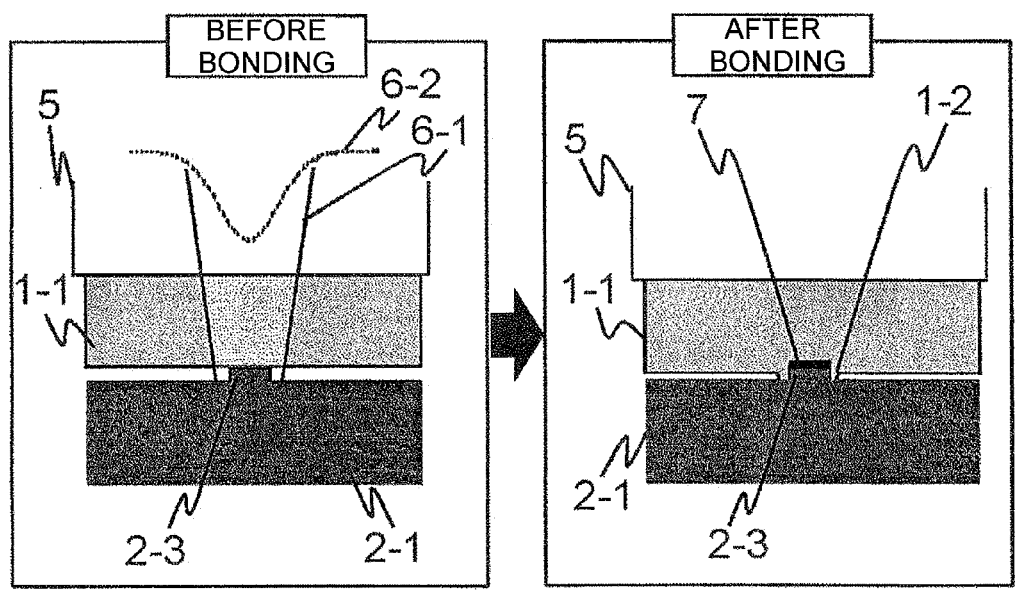
FIG. 5 is a view showing another embodiment of a laser bonding method for a thermoplastic resin and a metal of the invention.

FIG. 5 is a plan view showing another embodiment of the laser bonding method for a thermoplastic resin 1-1 and a metal of the invention.

In the laser bonding of a thermoplastic resin 1-1 and a metal 2-1, since the thermal conductivity of the metal 2-1 is high, the amount of input heat from a laser irradiated for bonding is increased. Therefore, a convex portion 2-3 is provided for the metal 2-1 so as to suppress heat diffusion in the width direction and limit the heat conduction only to the thickness direction, whereby it becomes possible to decrease the incident laser power. Further, by increasing the applied pressure, a fillet 1-2 is formed by the thermoplastic resin 1-1 so that an embedded structure can be formed and the strength against a load particularly in the shearing direction is improved.

Figure 6:
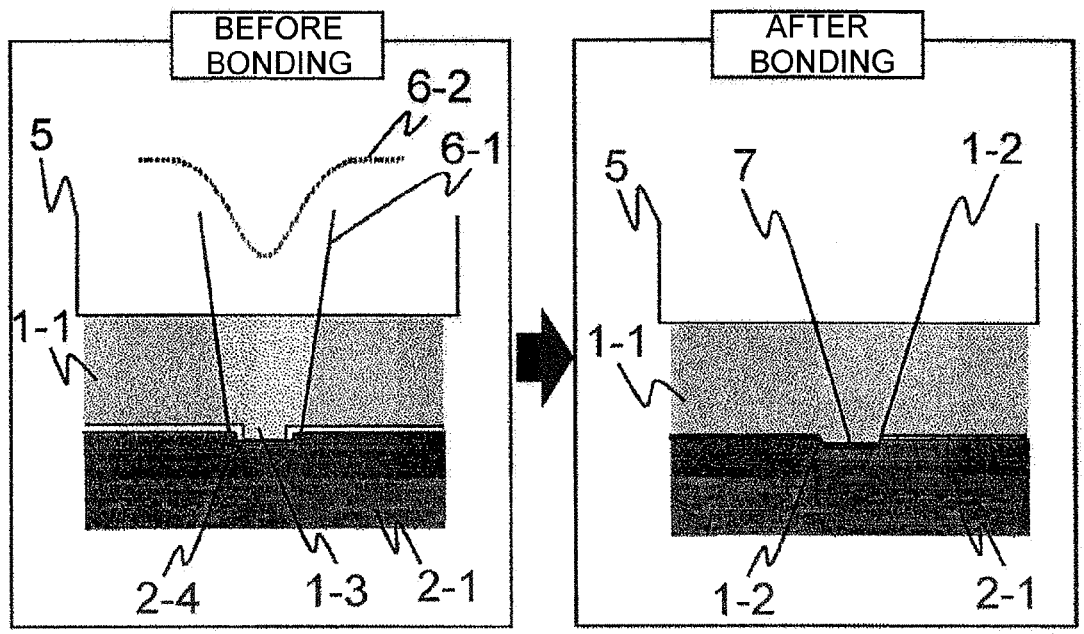
FIG. 6 is a view showing another embodiment of a laser bonding method for a thermoplastic resin and a metal of the invention.

Further, as shown in FIG. 6, the following means is also effective: a convex portion 1-3 is provided for the thermoplastic resin 1-1 and a concave portion 2-4 is provided for the metal 2-1, and laser light 6-1 is irradiated in a state where the convex portion 2-1 is inserted into the concave potion 2-4 to bring both members into close contact with each other, a fillet 1-2 is formed on the side of the thermoplastic resin 1-1, whereby an embedded structure is formed. In the laser bonding of the thermoplastic resin 1-1 and the metal 2-1, since the temperature of the thermoplastic resin 1-1 is increased to such an extent that a part of the resin is vaporized, and therefore, in some combinations, precise bonding cannot sometimes be achieved. Accordingly, this configuration is particularly effective in the case of performing precise bonding.

In the embodiment shown in FIGS. 5 and 6, it is desirable that the width of the convex portion 1-3 or the concave portion 2-4 is set smaller than the spot diameter of the used laser light 6-1 with an intensity distribution 6-2. The convex portion 2-3 or the convex portion 1-3 is formed so that the scanning direction of the laser light 6-1 coincides with the longitudinal direction thereof. Further, an oxide layer (not shown) is formed on the thermoplastic resin 1-1 at a position of bonding to the metal 2-1 (i.e., a position where the convex portion 2-3 of the metal comes into contact with the thermoplastic resin 1-1 in FIG. 5, or a tip end of the convex portion 1-3 in FIG. 6), however, it is not limited to those in which an oxide layer is formed.

Further, these inventions are not limited only to the case where the laser light 6-1 is irradiated from the side of the thermoplastic resin 1-1, and a case where the laser light 6-1 is incident from the side of the metal 2-1 may be possible, and even in such a case, an embedded structure can be formed by forming the fillet 1-2.

Figure 10:
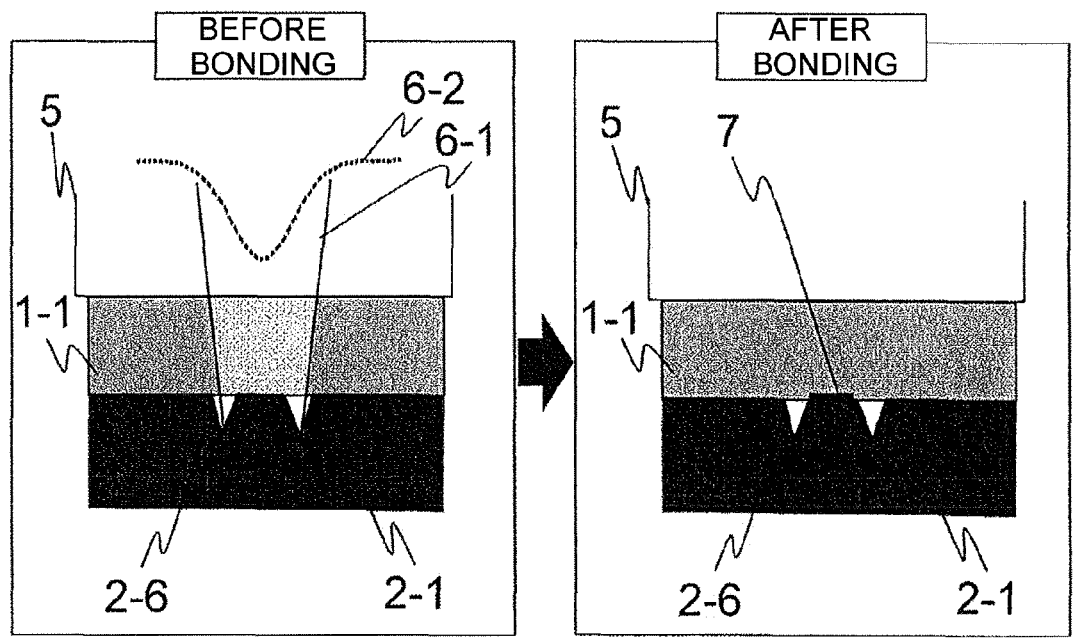
FIG. 10 is a view showing another embodiment of a laser bonding method for a thermoplastic resin and a metal of the invention.

On the other hand, it is sometimes preferable that a fillet is not formed in some products due to the appearance or size restriction. In such a case, as shown in FIG. 10, it is preferably to provide a groove 2-6 on both sides of a laser bonding portion 7 of the metal 2-1. The laser light is irradiated such that the grooves are irradiated with the light at the edge. By irradiating the laser light 6-1 from the side of the thermoplastic resin 1-1 or the metal 2-1 in this manner, the grooves serve as the ends of a portion to be bonded, and therefore, it becomes possible to bond only a necessary portion.

Embodiment 6

Figure 7:
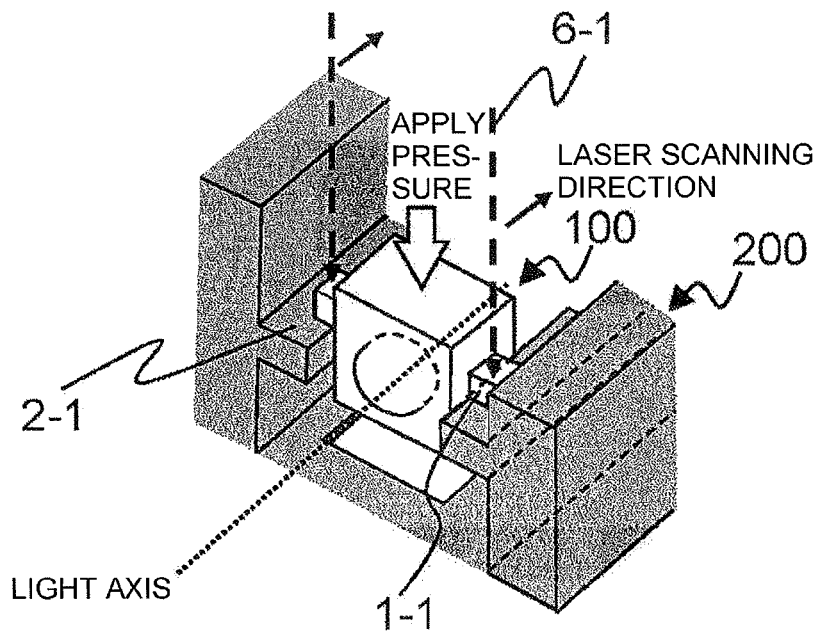
FIG. 7 is a plan view showing an assembly of a lens and a housing of a light pick-up device.

FIG. 7 is a perspective view showing one example when the laser bonding method for a thermoplastic resin 1-1 and a metal 2-1 of the invention is used and applied to a thermoplastic resin lens 100 and a metal housing 200 of a light pick-up device. By using the bonding method according to any of Embodiments 1 to 6, the thermoplastic resin lens 100 and the metal housing 200 are bonded to each other. As for a target part to which this configuration can be applied, this embodiment is effective in not only the bonding of the thermoplastic resin lens 100 to the metal housing 200, but also products such as biochips, electronic control units (ECUs), and connectors and overall products which can be subjected to laser bonding.

Embodiment 7

Figure 11:
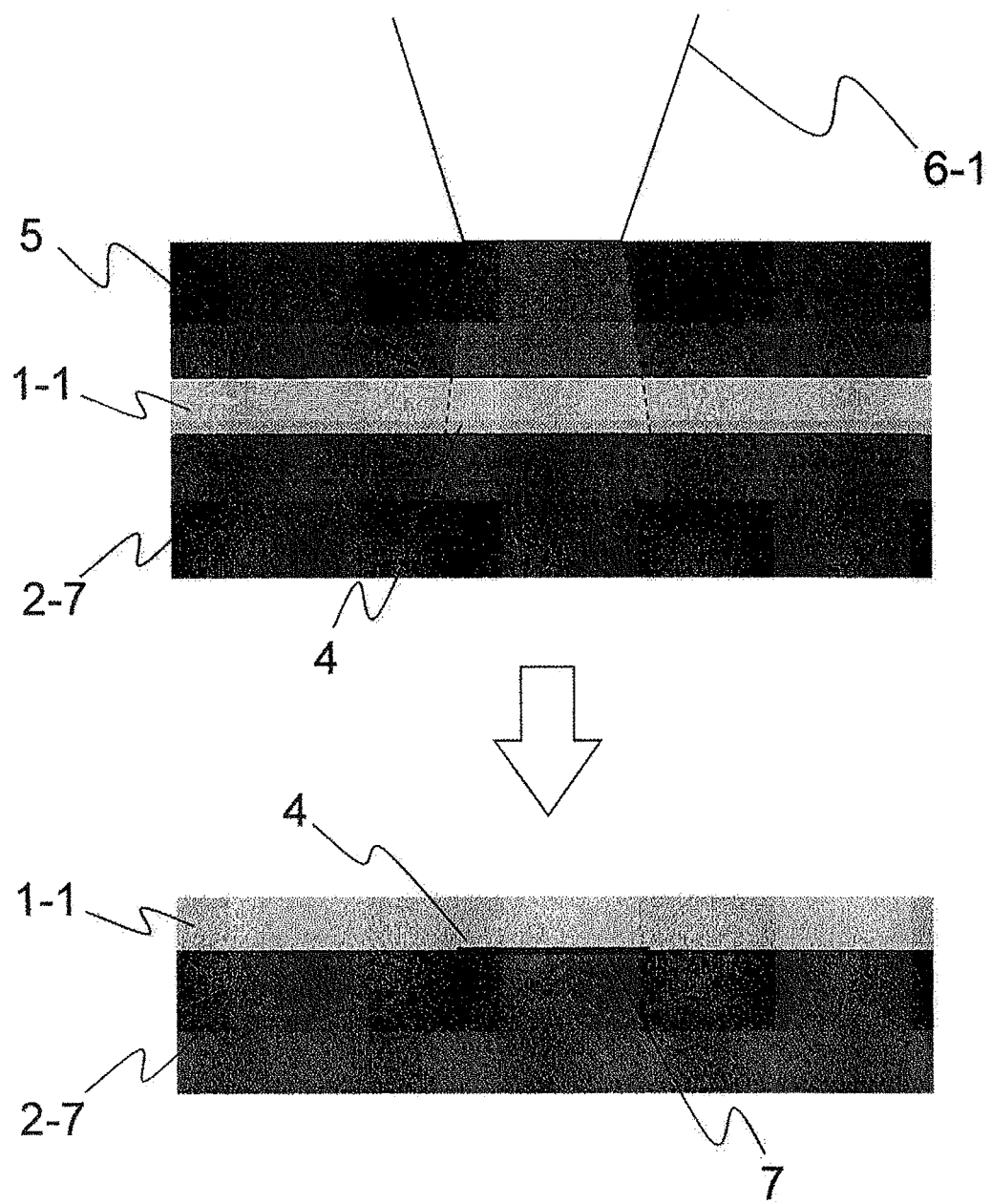
FIG. 11 is a view showing another embodiment of a laser bonding method for a thermoplastic resin and a metal of the invention.

FIG. 11 is a plan view showing another embodiment of the laser bonding method for a thermoplastic resin 1-1 and a metal 2-7 of the invention. In general, transparent glass is often used as a pressing material 5, however, after the material is used a lot, the glass may have scratches in some cases. As a result, such scratches may cause a decrease in transmittance so that stable bonding may not be obtained. Therefore, in this embodiment, in the case where the thermoplastic resin 1-1 and the metal 2-1 are bonded to each other, it is effective to use a metal as the pressing material 5 and irradiate laser light 6-1 onto the metal pressing material 5.

However, the metal serving as the pressing material 5 may be bonded to the thermoplastic resin 1-1 depending on the type of material of the thermoplastic resin 1-1. In particular, in the case where the thermoplastic resin 1-1 does not contain a polar group, the bonding strength is not exhibited or is low, and therefore, the thermoplastic resin 1-1 can be peeled off from the metal serving as the pressing material. However, in the case where PA6T, which is relatively easily bondable, is used as the thermoplastic resin 1-1, caution is required. In view of this, it is preferable to change the bondability of the thermoplastic resin 1-1 between the side of the pressing material 5 and the side of the metal 2-7. For example, a means in which the surface of the thermoplastic resin 1-1 on the side of the pressing material 5 is not subjected to a surface modification treatment, and only the surface thereof on the side of the metal 2-7 (i.e., the bonding side) is subjected to a surface modification treatment is effective. Incidentally, it is also effective to bring the close-contact surface between the metal serving as the pressing material 5 and the thermoplastic resin 1-1 into a polished state, and form fine irregularities 2-2 on the surface of the metal 2-7 on the side of the bonding portion.

It is preferable that the thickness of the metal material to be used as the pressing material 5 is decreased as much as possible while taking into account the rigidity thereof. Further, by providing protrusions 2-3 or grooves 2-6 for the pressing member, a region of the thermoplastic resin 1-1 where heat is conducted can be controlled, and therefore, the bonding width can also be controlled. Accordingly, this configuration is sometimes effective depending on the structure of products.

Embodiment 8

Figure 12:
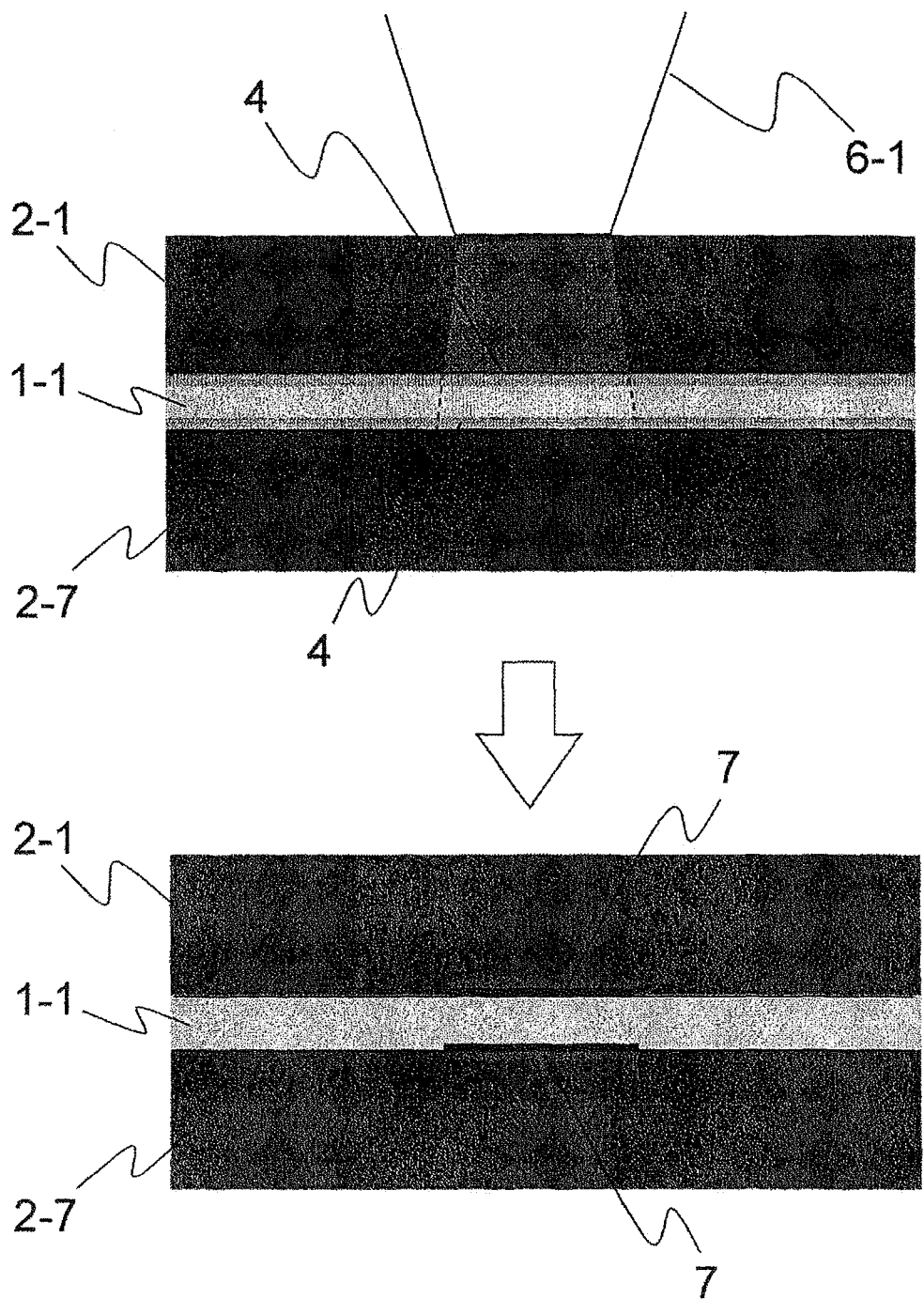
FIG. 12 is a view showing another embodiment of a laser bonding method for a thermoplastic resin and a metal of the invention.

FIG. 12 is a plan view showing another embodiment of the laser bonding method for a thermoplastic resin 1-1 and metals 2-1 and 2-7 of the invention, and shows a method and a configuration capable of forming a three-layer structure of the metal 2-1, the thermoplastic resin 1-1, and the metal 2-7 at a time. In addition to the configuration of Embodiment 7 (FIG. 11), by subjecting the resin on the side of the pressing material 5 (2-1) to a surface modification treatment, the pressing material 5 can be used as a bonding material. Incidentally, as the pressing material 5, a transparent material such as glass may be used. The method according to this embodiment is also a method utilizing the advantage of the surface modification treatment of the thermoplastic resin 1-1, and is a novel method and configuration in which the strength of the thermoplastic resin 1-1 and the metal 2-1 is exhibited by the surface modification treatment or the strength can be achieved by being able to bond both members with low energy.

Various studies have been performed for the welding of dissimilar metals, and depending on the combination of dissimilar metals, a decrease in bonding performance due to galvanic corrosion is often caused. Therefore, according to this configuration, the corrosion of dissimilar metals can be suppressed. In addition, it is also possible to control the conductivity or insulation according to the material of the thermoplastic resin 1-1 or the type of filler. Further, in some combinations of dissimilar metals, the metals even cannot be welded. In such a case, an adhesive has been used so far, however, this configuration also contributes to the improvement of sealing properties and reduction intact time. Incidentally, also in this configuration, it is preferable to form fine irregularities 2-2 on at least the interface on the side of the bonding portion of the metals 2-1 and 2-7. Further, in the case of using dissimilar metals, it is preferable to set the thermal conductivity of the metal 2-1 on the side to be irradiated with the laser light 6-1 larger than that of the other metal 2-7. In addition, it is also desirable to set the thickness of the other metal 2-7 smaller than that of the metal 2-1 on the side to be irradiated with the laser light 6-1. Incidentally, in the case of the method shown in FIGS. 11 and 12, it is preferable that the thickness of the thermoplastic resin 1-1 is smaller, and desirably is set to 2 mm or less.

Embodiment 9

Figure 13:
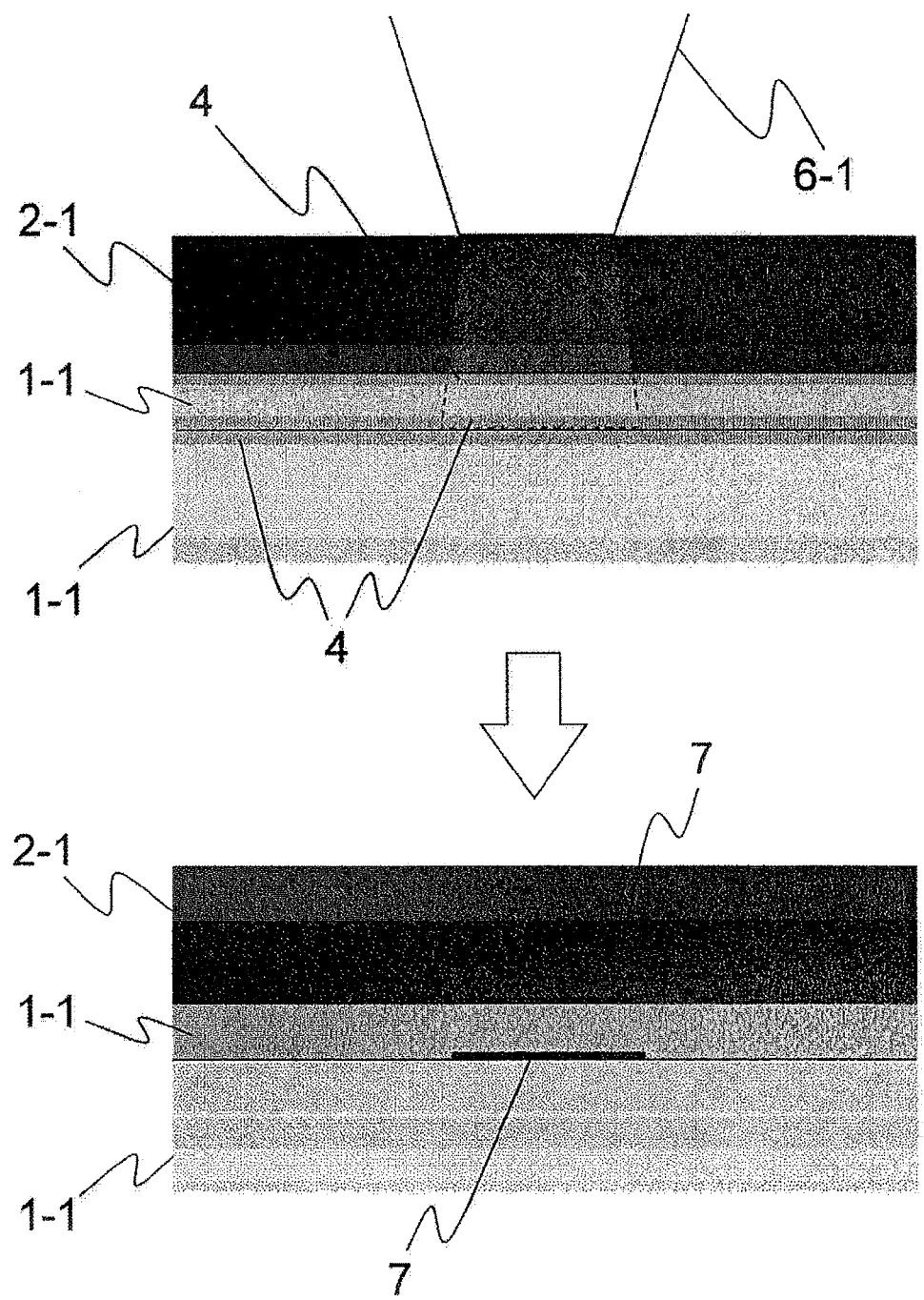
FIG. 13 is a view showing another embodiment of a laser bonding method for a thermoplastic resin and a metal of the invention.

FIG. 13 is a plan view showing another embodiment of the laser bonding method for a thermoplastic resin 1-1 and a metal 2-1 of the invention. In Embodiment 8, the metal 2-1, the thermoplastic resin 1-1, and the metal 2-7 are laminated, however, in this embodiment, a three-layer structure of the metal 2-1, the thermoplastic resin 1-1, and the thermoplastic resin 1-1 is employed. In this case, it is preferable that at least each bonding surface is subjected to a surface modification treatment. According to this configuration, as the resin of the intermediate layer, not only the thermoplastic resin 1-1, but also a thermosetting resin can be used.

Embodiment 10

Figure 14:
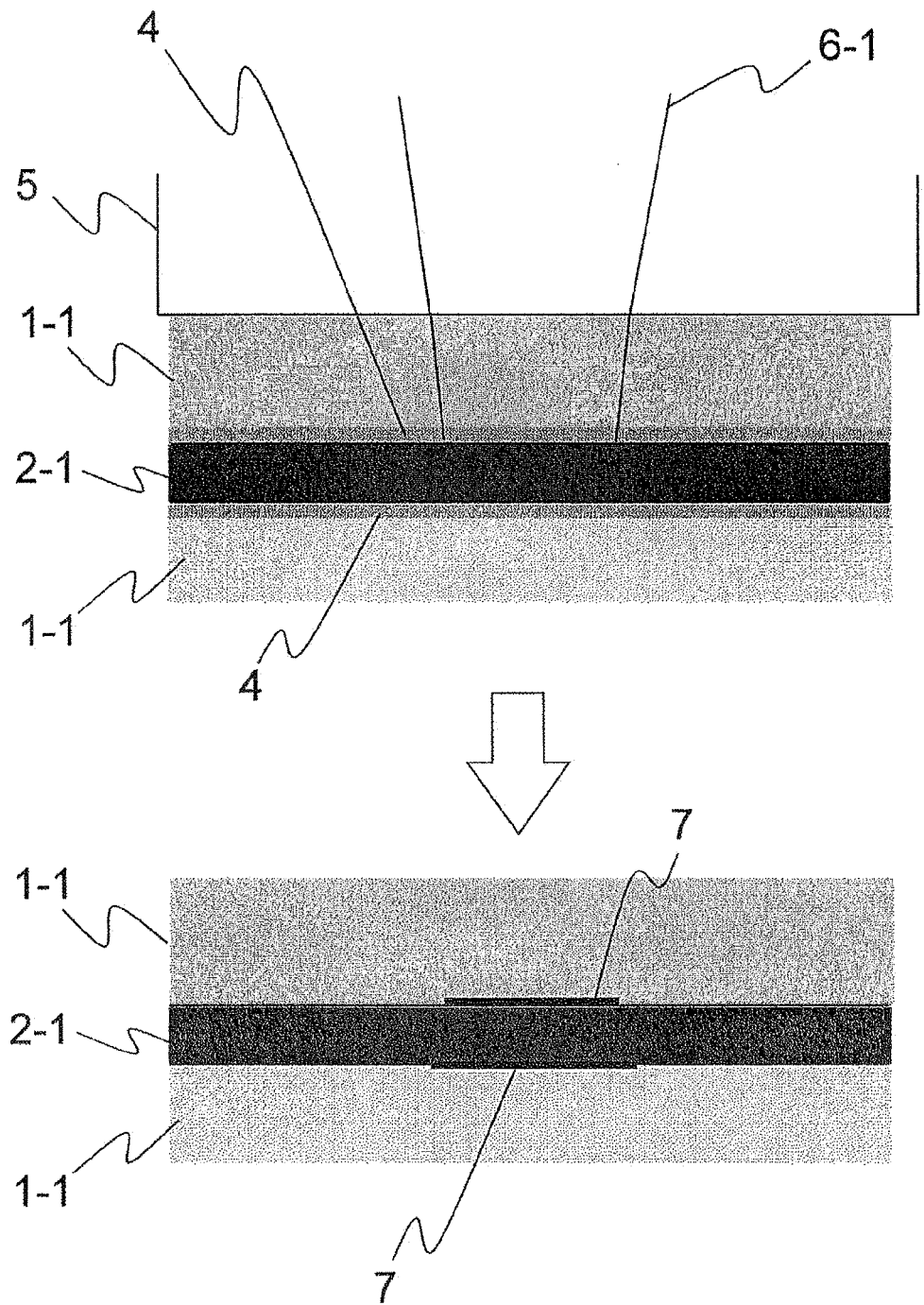
FIG. 14 is a view showing another embodiment of a laser bonding method for a thermoplastic resin and a metal of the invention.

FIG. 14 is a plan view showing another embodiment of the laser bonding method for a thermoplastic resin 1-1 and a metal 2-1 of the invention. In the case where the thickness of the metal 2-1 is small, the bonding of the thermoplastic resin 1-1, the metal 2-1, and the thermoplastic resin 1-1 can be achieved by irradiation with the laser 6-1 from one surface. Also in this case, it is preferable that the bonding surface of at least the resin is subjected to a surface modification treatment in the same manner as the previously described embodiments.

In the configuration described above, by combining the previously described laser bonding method, not only a complex having a three-layer structure, but also a complex having four or more layers can be formed according to the materials and thicknesses of the thermoplastic resin and the metal. Further, it is also possible to apply this embodiment to a ceramic, etc. other than a thermoplastic resin or a metal according to a structure.

Industrial Applicability

Since the structures of recent products become complicated, designing is made by utilizing the respective advantages of thermoplastic resins and metals, and therefore, a secondary processing technique thereof becomes important. When a thermoplastic resin is bonded to a metal, an adhesive has often been used conventionally. However, such an adhesive is often problematic due to its properties depending on products, for example, a component is contaminated with the adhesive due to outgassing, it is difficult to achieve precise bonding because the adhesive is a liquid, air tightness is poor, and so on. In addition, some types of adhesives require a furnace or a light source for curing. In such a case, it takes a long time for a curing process, and therefore, power consumption is large, and moreover, such an adhesive has a problem that the environmental load thereof is large. According to the respective embodiments described above, a thermoplastic resin and a metal can be directly and strongly laser-bonded to each other, and therefore, such a technique can be substituted for adhesion having a large environmental load. Further, such a technique can also contribute to the improvement of the properties of the products and reduction in costs.

DESCRIPTION SIGN LIST 1-1: thermoplastic resin, 1-2: fillet, 1-3: convex portion, 2-1: metal, 2-2: fine irregularities, 2-3: convex portion, 2-4: concave portion, 2-5: step, 2-6: groove, 2-7: metal on the side not directly irradiated with laser light, 3: main chain, 4: oxide layer, 5: pressing material, 6-1: laser light, 6-2: laser intensity distribution, 7: bonding interface, 8: intermediate material, 100: lens, 200: housing The invention claim is:

1. A laser bonding method, comprising:
a step of subjecting an interface of a thermoplastic resin to a surface modification treatment to form or increase an oxygen functional group; and
a step of bonding the interface of the thermoplastic resin subjected to the surface modification treatment to a metal by heating through laser irradiations;
wherein the bonding step is performed in a state where the surface energy of the metal on a bonding surface side is increased to be larger than that of the interface subjected to the surface modification treatment.

2. The laser bonding method according to claim 1, wherein the laser is irradiated onto the bonding surface of the metal through the thermoplastic resin.

3. The laser bonding method according to claim 2, wherein a surface of the thermoplastic resin on the opposite side to the bonding surface is subjected to the surface modification treatment, and while pressing the surface on the opposite side to the bonding surface by a pressing material and interposing water between the thermoplastic resin and the pressing material, the laser is irradiated through the pressing material, the water, and the thermoplastic resin.

4. The laser bonding method according to claim 2, wherein the thermoplastic resin subjected to the surface modification treatment is provided on both surfaces of the metal, and the laser is irradiated through one of the thermoplastic resins, whereby the thermoplastic resins are bonded to both surfaces of the metal.

5. The laser bonding method according to claim 1, wherein the laser is irradiated from the metal side and heat is conducted to a bonding portion between the metal and the thermoplastic resin.

6. The laser bonding method according to claim 5, wherein a surface of the thermoplastic resin on the opposite side to the metal is subjected to the surface modification treatment, and the laser is irradiated from the metal side in a state where a bonding member is in contact with the surface of the thermoplastic resin on the opposite side to the metal, whereby the thermoplastic resin and the bonding member are bonded to each other.

7. The laser bonding method according to claim 6, wherein the bonding member comprises a metal or a thermoplastic resin.

8. The laser bonding method according to claim 1, wherein the thermoplastic resin or the metal has a convex portion formed thereon, and the convex portion is brought into contact with the thermoplastic resin or the metal, which is a bonding target, and the laser light with a laser spot size larger than the width of the convex portion is irradiated onto the contacted portion.

9. The laser bonding method according to claim 8, wherein the convex portion is provided for the metal.

10. The laser bonding method according to claim 8, wherein the convex portion is provided for the thermoplastic resin, a concave portion with a width larger than that of the convex portion is provided for the metal, and the laser is irradiated in a state where the convex portion is inserted into the concave portion.

11. The laser bonding method according to claim 1, wherein the surface modification treatment is a dry treatment selected from a UV ozone treatment, a plasma treatment, a corona treatment, and a short-pulse laser treatment.

12. The laser bonding method according to claim 1, wherein the bonding is performed in a state where the surface roughness of the metal is larger than that of the thermoplastic resin.

13. The laser bonding method according to claim 1, wherein the thermoplastic resin does not contain a polar group in its main chain.

14. The laser bonding method according claim 1, wherein the metal has a groove in a portion to be irradiated with the laser.

15. The laser bonding method according to claim 1, wherein while pressing a surface of the thermoplastic resin on the opposite side to the bonding surface by a pressing material made of a metal, the laser is irradiated onto the pressing material made of a metal, and heat is conducted to a bonding portion between the metal and the thermoplastic resin, whereby the bonding is achieved.

* * * * *